(12) United States Patent
Mahmoud (10) Patent No.: US 6,970,986 B1
(45) Date of Patent: Nov. 29, 2005

(54) SOFTWARE BASED SYSTEM AND METHOD FOR I/O CHIP HIDING OF PROCESSOR BASED CONTROLLERS FROM OPERATING SYSTEM

(75) Inventor: Fadi A. Mahmoud, Livermore, CA (US)

(73) Assignee: Adaptec, Inc., Milpitas, CA (US)

( * ) Notice: Subject to any disclaimer, the term of this patent is extended or adjusted under 35 U.S.C. 154(b) by 394 days.

(21) Appl. No.: 10/153,549

(22) Filed: May 21, 2002

(51) Int. Cl.[7] .............................................. G06F 12/06
(52) U.S. Cl. ..................... 711/158; 710/117; 710/124; 710/45; 710/46; 710/44; 711/151; 713/1
(58) Field of Search ............... 713/189, 1, 2; 710/1–74, 710/100, 124, 117, 109; 711/158, 151, 145

(56) References Cited

U.S. PATENT DOCUMENTS

| | | | | |
|---|---|---|---|---|
| 5,954,809 A | * | 9/1999 | Riley et al. .................. | 710/119 |
| 6,073,199 A | * | 6/2000 | Cohen et al. ................ | 710/113 |
| 6,415,348 B1 | * | 7/2002 | Mergard et al. ............. | 710/305 |
| 6,457,069 B1 | * | 9/2002 | Stanley .......................... | 710/8 |
| 2003/0188061 A1 | * | 10/2003 | Luse et al. ................... | 710/104 |
| 2003/0212846 A1 | * | 11/2003 | Luse et al. ................... | 710/305 |
| 2005/0044439 A1 | * | 2/2005 | Shatas et al. ................ | 713/400 |

* cited by examiner

Primary Examiner—Pierre-Michel Bataille
(74) Attorney, Agent, or Firm—Martine Penilla & Gencarella, LLP (57) ABSTRACT

An invention is provided for hiding an input/output device from an operating system. A window of time is provided wherein a specific input/output processor (IOP) has exclusive access to a bus. An IOC memory map register, which is utilized by an input/output chip (IOC), is configured during the window of time using the IOP. In addition, a hide indicator is configured to indicate the IOC should be hidden. In this manner, data is communicated between the IOP and the IOC using the IOC memory map register. In one aspect, the hide indicator can be configured, before the window of time, to indicate the IOC should be hidden. In addition, the hide indicator can be configured during the window of time to indicate the IOC should be exposed.

20 Claims, 7 Drawing Sheets

SOFTWARE BASED SYSTEM AND METHOD FOR I/O CHIP HIDING OF PROCESSOR BASED CONTROLLERS FROM OPERATING SYSTEM

CROSS REFERENCE TO RELATED APPLICATIONS

This application is related to U.S. patent application Ser. No. 09/825,818, filed Apr. 4, 2001, and entitled "Circuit and Method For Hiding Peer Devices in a Computer Bus," which is incorporated herein by reference.

BACKGROUND OF THE INVENTION

1. Field of the Invention

This invention relates generally to I/O processor based controllers, and more particularly to I/O chip hiding of processor based controllers from operating systems.

2. Description of the Related Art

The use of personal computers has expanded remarkably in recent years. Modern personal computers are generally characterized by a flexible hardware architecture and a relatively open software architecture. The use of standardized bus architectures (such as the PCI Bus and the Fibre Channel) has permitted users to customize their personal computers to meet their particular hardware and software needs. In consequence, a variety of input and output devices are available for most popular personal computers.

It is beneficial to have a large selection of reliable input/output (I/O) devices. The availability of such a wide range of input-output devices increases the size of the market of potential purchasers of such devices by providing the customization capabilities desired by a larger pool of potential purchasers. Furthermore, it is helpful for input-output devices to embody a greater degree of "intelligence." Thus, for example, it would be desirable for each input-output device to be able to perform its function without needing active supervision or interaction with the central processing units (CPUs) of the computer system.

Figure 1:
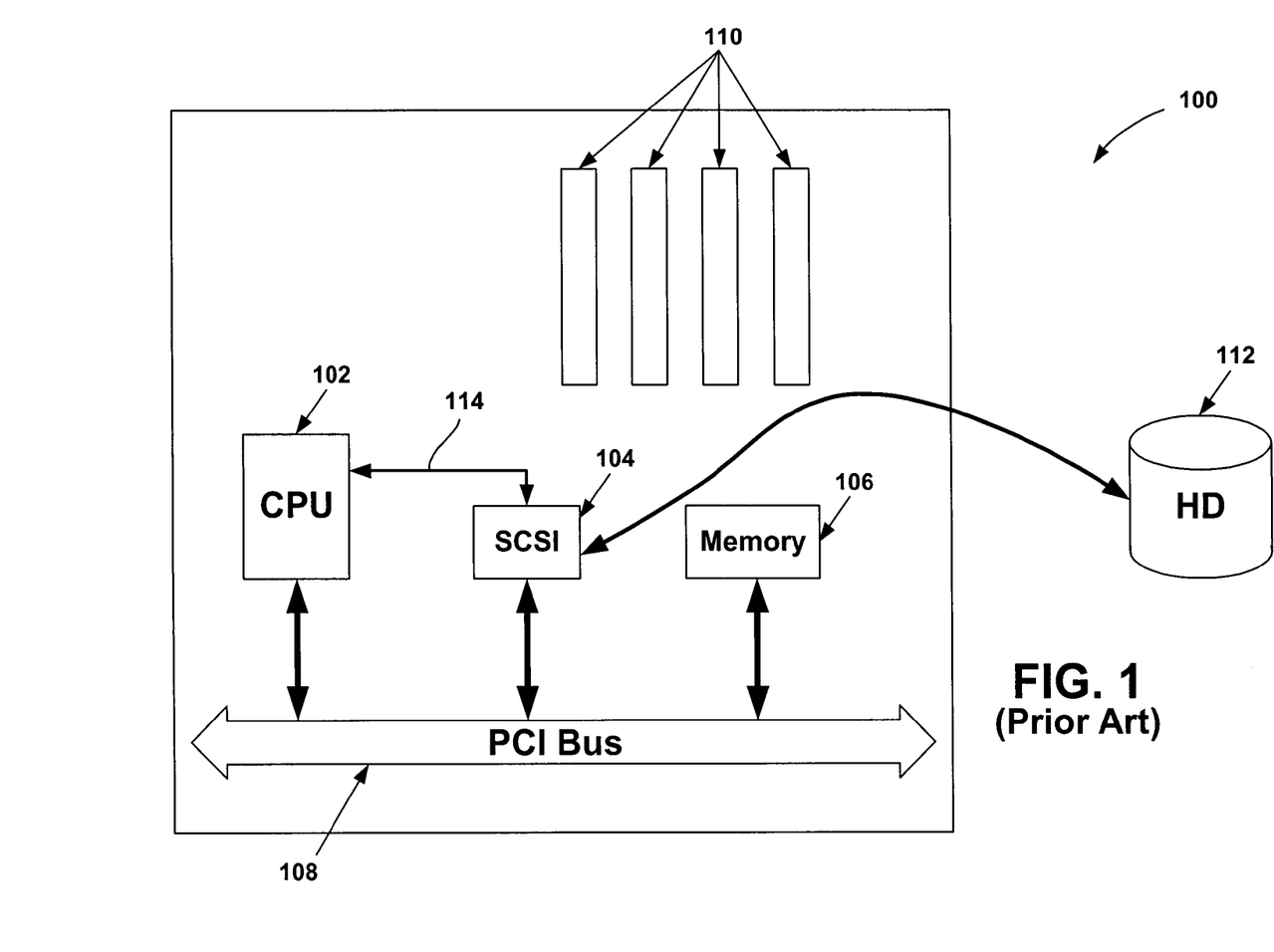
FIG. 1 is a block diagram showing an exemplary conventional computer motherboard having an on-board small computer system interface (SCSI) controller.

FIG. 1 is a block diagram showing an exemplary conventional computer motherboard 100 having an on-board small computer system interface (SCSI) controller. The computer motherboard 100 includes a central processing unit (CPU) 102 in communication with a peripheral component interconnect (PCI) bus 108. The PCI bus 108 is further in communication with a SCSI controller 104, system memory 106, and a SCSI hard drive 112 for persistent storage. In addition, the computer motherboard 100 includes a plurality of PCI connection ports 110, or "slots," in communication with the PCI bus 108, for PCI based cards. PCI provides a high-speed data path between the CPU and peripheral devices (video, disk, network, etc.), and allows "plug and play" capability, automatically configuring the PCI cards at startup. Further, PCI allows interrupt requests (IRQs) to be shared. IRQs are used to signal the CPU 102 that a peripheral event has started or terminated. Thus, sharing of IRQs helps solve the problem of limited IRQs being available on a computer system. For example, if only one IRQ remains after industry standard architecture (ISA) devices are given their required IRQs, all PCI devices could share the remaining IRQ.

The SCSI controller 104 provides a hardware interface that allows for the connection of a plurality of peripheral devices. Typically, SCSI peripherals are daisy chained together using a second port for connecting to the next device in line. However, in the example of FIG. 1, the SCSI controller 104 controls a single hard drive 112.

To read a file from the hard drive 112, the CPU 102 transmits an interrupt signal to the SCSI controller 104 via IRQ line 114, and also provides a read command to the SCSI controller 104 using the PCI bus 108. In response, the SCSI controller 104 transmits a command to the SCSI hard drive 112 to access the particular disk sectors. When the SCSI hard drive 112 reports back, the SCSI controller 104 uses direct memory access (DMA) circuitry to transfer the data on the SCSI hard drive 112 directly to the system memory 106. The DMA circuitry is specialized circuitry that transfers data from memory to memory without using the CPU 102, which allows data to be transferred much faster than using the CPU 102 for every byte of transfer.

Once the transfer is complete, the SCSI controller 104 transmits an interrupt indicating the data is in memory to the CPU 102 via the IRQ line 114. Most input-output devices generate responses and initiate communications with the CPU 102 by generating an interrupt. Such an interrupt causes the CPU 102 to suspend execution of whatever task the CPU 102 is currently executing in order to respond to the I/O device generating the interrupt, in this case the SCSI controller 104. Thereafter, the CPU 102 can obtain the requested data from the system memory 106 using the PCI bus 108.

Figure 2:
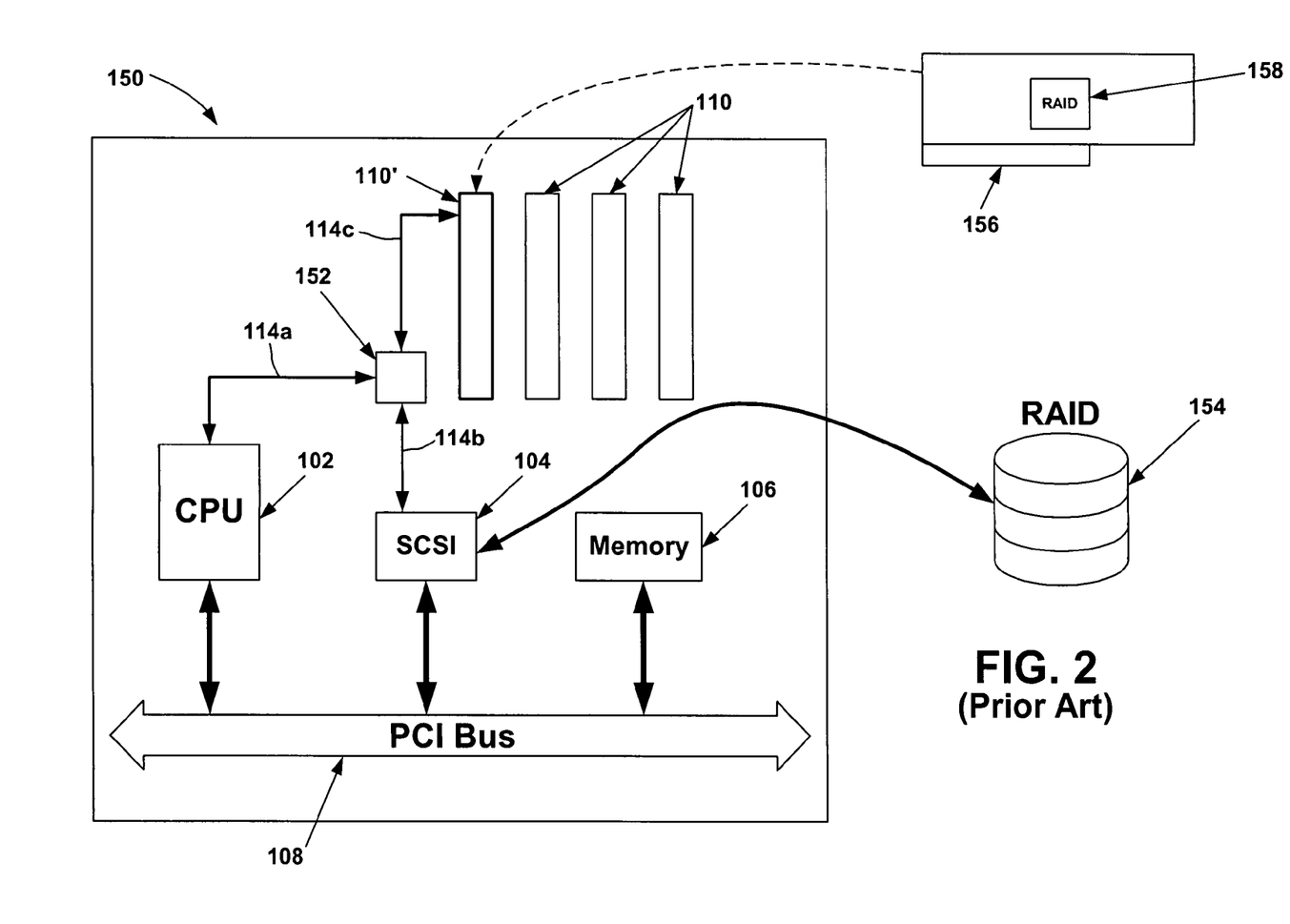
FIG. 2 is a block diagram showing an exemplary conventional computer motherboard having interrupt control logic.

To provide faster access to particular peripheral device configurations, such as redundant array of independent disks (RAID) configurations, special motherboard configurations can be used. For example, FIG. 2 is a block diagram showing an exemplary conventional computer motherboard 150 having interrupt control logic. As above, the computer motherboard 150 includes a central processing unit (CPU) 102 in communication with a PCI bus 108. The PCI bus 108 is further in communication with a SCSI controller 104, system memory 106, and a RAID array 154 for persistent storage. In addition, the computer motherboard 150 includes a plurality of PCI slots 110 for PCI based cards.

The RAID array 154 is a collection of drives that collectively act as a single storage system, which can tolerate the failure of a drive without losing data, and can operate independently of each other. The RAID array 154 improves performance by disk striping, which interleaves bytes or groups of bytes across multiple drives, so more than one disk is reading and writing simultaneously. Mirroring or parity is used achieve fault tolerance. Mirroring is 100% duplication of the data on two drives and parity is used to calculate the data in two drives and store the results on a third. For example, a bit from drive 1 is XOR'd with a bit from drive 2, and the result bit is stored on drive 3. In addition, a failed drive can be hot swapped with a new one, and a related RAID firmware can automatically rebuild the lost data.

The computer motherboard 150 further includes an interrupt control circuit 152 that controls interrupt signals from the CPU 102, SCSI controller 104, and a RAID PCI slot 110' via IRQ connections 114a, 114b, and 114c respectively. The RAID PCI slot 110' is a PCI slot configured to allow communication between host adapter cards and the interrupt control circuit 152. Specifically, the RAID PCI slot 110' is configured for use with a RAID host adapter card 156, which includes a RAID firmware 158 having an I/O processor (IOP). In use, the RAID host adapter card 156 is inserted into the RAID PCI slot 110', which provides a link between the RAID firmware 158 and the interrupt control circuit via IRQ connection 114c.

The interrupt control circuit 152 routes interrupts depending on the configuration. For example, in FIG. 2, the interrupt control circuit 152 reroutes the SCSI controller 104 interrupt from the CPU 102 to the RAID firmware 158. In this manner, the RAID firmware 158 can directly control the SCSI controller 104. For example, to read a file from the RAID array 154, the IOP of the RAID firmware 158 transmits an interrupt signal to the SCSI controller 104 via the interrupt control logic 152, and provides a read command to the SCSI controller 104 using the PCI bus 108. In response, the SCSI controller 104 transmits a command to the RAID array 154 to access the particular disk sectors. When the RAID array 154 reports back, the SCSI controller 104 uses direct memory access (DMA) circuitry to transfer the data on the RAID array 154 directly to the system memory 106. Once the transfer is complete, the SCSI controller 104 transmits an interrupt, indicating the data is in memory, which is rerouted by the interrupt control circuitry 152 to the IOP of the RAID firmware 158.

In addition to controlling interrupt signals, the interrupt control logic 152 also hides the SCSI controller 104 from the CPU 102. By hiding the SCSI controller 104 from the CPU 102, the interrupt control logic 152 allows the operating system executing on the CPU 102 to see only the IOP of the RAID firmware 158. Because operating systems often have problems processing information from two devices drivers for a single PCI device, the system performs better when only one IOP is presented to it.

For example, during a shutdown process, the operating system will find the driver for each PCI device and command it to shutdown its corresponding peripheral devices. When both the IOP of the RAID firmware 158 and the SCSI controller 104 are visible to the operating system, problems can occur. Specifically, the operating system will command the IOP of the RAID firmware 158 to shutdown. In response, the IOP of the RAID firmware 158 will command the SCSI controller 104 to shutdown. The operating system will also attempt to shutdown the SCSI controller 104. However, in the configuration of FIG. 2, the SCSI controller 104 will not have a corresponding driver, which will cause an error. Errors can also occur when the SCSI controller 104 does have a corresponding driver. In these circumstances, the operating system will attempt to update the boot disk prior to shutting the system down. However, the SCSI controller 104 will have already been shutdown by the IOP of the RAID Firmware 158. As a result, the operating system will not be able to update the boot disk, resulting in an error.

Thus, I/O chip hiding is important in system configurations such as that of FIG. 2. Unfortunately, not all motherboards include interrupt control circuitry 152 to hide multiple IOP devices. As a result, configurations such as that of FIG. 2 conventionally cannot be used on these types of motherboards.

In view of the foregoing, there is a need for systems and methods for I/O chip hiding of processor based controllers from operating systems. The methods should not require hardware changes, and should allow multiple IOP devices for a single peripheral device.

SUMMARY OF THE INVENTION

Broadly speaking, embodiments of the present invention fill these needs by providing software based I/O chip hiding. In one embodiment, a method for hiding an input/output device from an operating system is disclosed. A window of time is provided wherein a specific input/output processor (IOP) has exclusive access to a bus. An IOC memory map register in configuration space, which is utilized by an input/output chip (IOC), is configured during the window of time using the IOP. In addition, a hide indicator is configured to indicate the IOC should be hidden. In this manner, data is communicated between the IOP and the IOC using the IOC memory map register. In one aspect, the hide indicator can be configured, before the window of time, to indicate the IOC should be hidden. In addition, the hide indicator can be configured during the window of time to indicate the IOC should be exposed. In this aspect, the hide indicator can be configured to expose the IOC prior to configuring the IOC memory. The hide indicator can be a hide bit, such as an IDSEL bit, or an IDSEL pin, or other indicator that can be utilized to indicate the hide state of the IOC. In one aspect, a system bios can provide the window of time using a peripheral component interconnect (PCI) master arbiter.

A system for hiding an input/output device from an operating system is disclosed in an additional embodiment of the present invention. The system includes an IOC and an IOP both in communication with a bus. The IOP is configured to control the IOC, such as a RAID host adapter configured to control a SCSI controller. The system further includes a system bios that provides a window of time during bootup and power on self test (POST) wherein the IOP has exclusive access to the bus. POST is a series of built-in diagnostics performed by the system bios when the computer is first started. The IOP configures an IOC memory map register during the window of time such that the configured IOC memory map register allows communication between the IOP and the IOC. In addition, the IOP configures a hide indicator to indicate the IOC should be hidden. Optionally, the system bios can configure the hide indicator before the window of time to indicate the IOC should be hidden. Further, the IOP can configure the hide indicator, during the window of time, to indicate the IOC should be exposed. In this aspect, the hide indicator can be configured to expose the IOC prior to configuring the IOC memory map register. Optionally, the system bios can provide a new window of time wherein the IOP has exclusive access to the bus in response to an operating system reassigning the IOC memory. In this aspect, the IOP reconfigures the IOC memory during the new window of time such that the reconfigured IOC memory allows communication between the IOP and the IOC.

In a further embodiment, a computer program embodied on a computer readable medium for hiding an input/output device from an operating system is disclosed. The computer program includes a code segment that provides a window of time wherein a specific IOP has exclusive access to a bus, and a code segment that configures an IOC map register, which is utilized by an IOC, during the window of time. In addition, a code segment that configures a hide indicator to indicate the IOC should be hidden is included. In this manner, data is communicated between the IOP and the IOC using the IOC memory. Optionally, a system bios can include the code segment that provides the window of time. In this aspect, the system bios can utilize a PCI master arbiter to facilitate providing the window of time.

Embodiments of the present invention advantageously allow I/O chip hiding using software. As a result, special hardware generally is not required, thus allowing the embodiments of the present invention to be utilized on motherboards not having specific chip hiding circuitry. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for a software based I/O chip hiding. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

As mentioned previously, not all motherboards include interrupt control circuitry to hide multiple IOP devices. Thus, embodiments of the present invention utilize software to perform I/O chip hiding. Broadly speaking, embodiments of the present invention configure the system bios to provide a window of time wherein a particular IOP has exclusive access to the PCI bus. During this window of time, the IOP can configure the I/O chip memory to allows the IOP and the I/O chip to communicate while the I/O chip is hidden.

Figure 3:
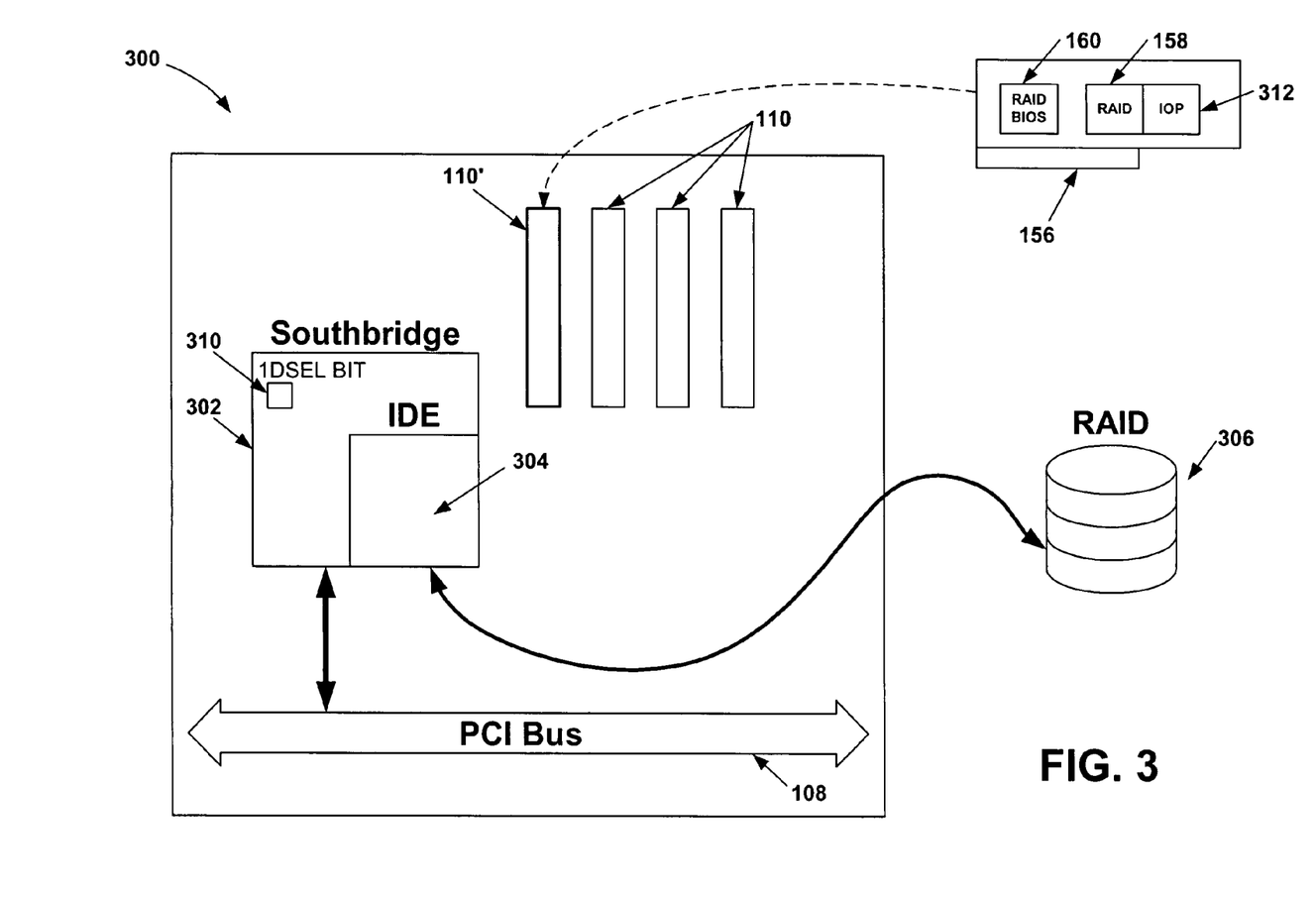
FIG. 3 is a block diagram showing a computer motherboard having a Southbridge for I/O management.

FIG. 3 is a block diagram showing a computer motherboard 300 having a Southbridge for I/O management. The computer motherboard 300 includes a Southbridge device 302 in communication with a peripheral component interconnect (PCI) bus 108. The Southbridge device 302 is a chipset that manages basic forms of input/output (I/O) in a computer, such as Universal Serial Bus (USB), serial, audio, Integrated Drive Electronics (IDE), and Industry Standard Architecture (ISA) I/O. One of two chipsets collectively called Northbridge/Southbridge, the Southbridge device 302 is located on Northbridge's PCI bus. The Northbridge controls the processor, memory, PCI bus, Level 2 cache, and Accelerated Graphics Port (AGP) activities.

Referring back to FIG. 3, an IDE I/O chip (IOC) 304, which provides I/O management for IDE based devices, is in communication with a RAID array 306 for persistent storage. In addition, the computer motherboard 300 includes a plurality of PCI connection ports 110, or "slots," in communication with the PCI bus 108, for PCI based cards. In the example of FIG. 3, a RAID host adapter card 156, which includes a RAID firmware 158 having a RAID I/O processor (IOP) 312, is inserted into the RAID PCI slot 110'.

The IDE I/O chip (IOC) 304 is located within the Southbridge device 302. IDE is a standard electronic interface used between a computer motherboard's data paths or bus and the computer's disk storage devices. Although the following description describes the IOC in terms of an IDE IOC, it should be noted that embodiments of the present invention can be utilized with any type of IOC, such as a SCSI IOC or Fibre Channel IOC.

Since both the IDE IOC 304 and the RAID IOP 312 are present in the system, embodiments of the present invention can be used to hide the IDE IOC 304 from the operating system. However, the Southbridge device 302 generally does not include an IDSEL pin for the IDE IOC 304. Instead, the Southbridge device 302 includes an internal IDSEL bit 310, which is used to represent an IDSEL pin. Embodiments of the present invention utilize the internal IDSEL bit 310 as a hide indicator to indicate whether the RAID host adaptor card 156 is present in the system, and thus, whether I/O chip hiding is necessary. However, it should be noted that embodiments of the present invention are not limited to using an IDSEL bit as hide indicator. For example, when using a SCSI IOC, embodiments of the present invention can utilize the internal hide bit in the configuration space of the SCSI IOC as a hide indicator.

During system startup, the system bios determines whether the host adaptor card 156 is present in one of the PCI slots 110. If the host adaptor card 156 is not present, the IDE IOC 304 does not require hiding from the operating system. On the other hand, when the host adaptor card 156 is present, the IDE IOC 304 should be hidden from the operating system. Hence, when the host adaptor card 156 is present in the system, the system bios configures the hide indicator to indicate the IDE IOC 304 should be hidden from the operating system. For example, in FIG. 3, the system bios writes a one to the IDSEL bit 310 in the Southbridge device 302 to indicate the IDE IOC 304 should be hidden from the operating system, since the RAID host adapter card 156 is inserted into the RAID PCI slot 110'.

Next, the IOP kernel within the RAID IOP 312 begins execution. During execution, the IOP kernel determines the state of itself. That is, the IOP kernel determines that it is located in the RAID IOP 312, which is located on the RAID host adaptor 156 that is plugged into PCI slot 110'. Once its state is determined, the IOP kernel begins to configure the RAID IOP 312. For example, the IOP kernel configures the memory addresses, I/O addresses, and device IDs.

To perform this operation, the IOP kernel aligns the memory needed for the RAID IOP 312 and the IDE IOC 304 by configuring IOP registers. One of the functions of the IOP registers is to indicate the amount of system memory needed by the RAID IOP 312. Generally, during startup, the system bios examines these registers to determine the amount of system memory to set aside for use by the RAID IOP 312. Embodiments of the present invention configure IOP registers to set aside enough memory for both the RAID IOP 312 and the IDE IOC 304. That is, the IOP kernel stores the sum of the amount of memory needed by the IDE IOC 304 and the amount of memory needed by the RAID IOP 312 in the IOP registers. In this manner, the bios will set aside enough memory for both the RAID IOP 312 and the IDE IOC 304, and the RAID IOP 312 can provide that memory to the IDE IOC 304 when needed.

The IOP kernel also configures the hide indicator to expose the IDE IOC 304. For example, in FIG. 3 the IOP kernel writes a zero to the IDSEL bit 310 to expose the IDE IOC 304. Since the RAID IOP 312 will control the IDE IOC 304, the RAID IOP 312 needs to configure the IDE IOC 304.

However, as mentioned previously, the system bios hides the IDE IOC 304 when the host adaptor card 156 is present. Thus, the IOP kernel exposes the IDE IOC 304 so that the IOP kernel can configure the IDE IOC 304. However, when the IOP kernel exposes the IDE IOC 304, other system elements can potentially see the IDE IOC 304 and begin using it, which is undesirable.

To address this issue, embodiments of the present invention configure the system bios such that it guarantees a window of time wherein no other system element can win arbitration on the PCI bus 108 for the IOC 304, using for example a master arbiter. For example, the window of time can be 64 PCI (or similar bus) cycles, 128 PCI cycles, 256 PCI cycles, or more, as desired by the developer. During this window of time, the IOP kernel configures the IOC 304, and sets the hide bit 310 again to hide the IOC 304. Thereafter, the IOP kernel can communicate with the IOC 304 through memory space, as described next with reference to FIG. 4.

Figure 4:
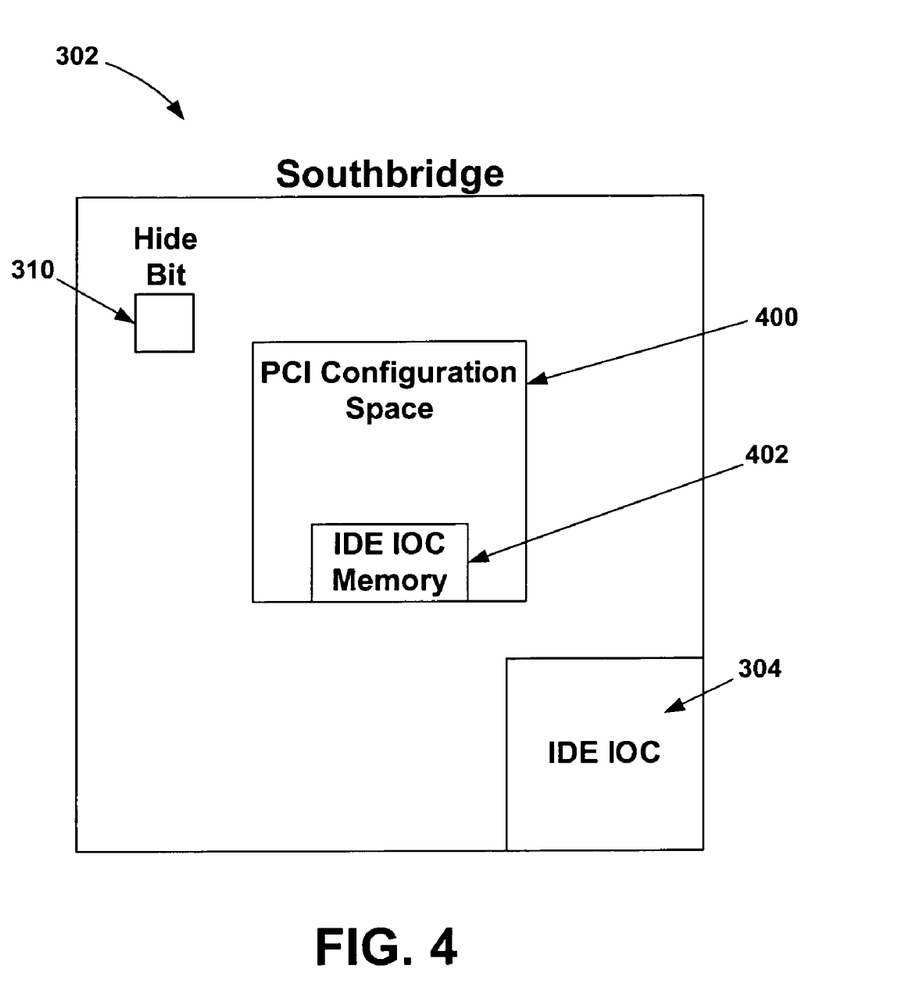
FIG. 4 is a block diagram showing a Southbridge I/O device having a PCI configuration memory space, in accordance with an embodiment of the present invention.

FIG. 4 is a block diagram showing a Southbridge I/O device 302 having a PCI configuration memory space, in accordance with an embodiment of the present invention. The Southbridge I/O device 302 includes a hide bit 310, which can be for example an IDSEL bit, and an IDE IOC 304. As mentioned above, the hide bit 310 is utilized by the embodiments of the present invention to hide the IDE IOC 304 from system elements. In addition, the Southbridge 302 includes a PCI configuration space 400, which includes an IDE IOC memory space 402. As mentioned previously, the system bios assigns the IDE IOC memory 402 during startup. Moreover, in the embodiments of the present invention, the IOP kernel requests memory for both the IDE IOC 304 and the RAID IOP 312. As a result, IOP kernel can provide the IDE IOC memory 402, assigned by the system bios during startup, to the IDE IOC 304.

During startup, as discussed previously, the system bios provides a window of time wherein no system element, other than the IOP kernel, can win arbitration on the PCI bus 108 for the IDE IOC 304. During this window of time, the IOP kernel writes a zero to the hide bit 310 to expose the IDE IOC 304. In addition, the IOP kernel configures the IDE IOC memory 402 during the window of time provided by the system bios. Because the IOP kernel provides the IDE IOC memory 402 to the IDE IOC 304, the IOP kernel is aware of the location of the IDE IOC memory 402.

After configuring the IDE IOC memory 402, the IOP kernel writes a one to the hide bit 310 to hide the IDE IOC 304. At this point, the system bios can allow other system elements to win arbitration to the PCI bus 108 because the IDE IOC 304 is hidden from all system elements. Thereafter, the IOP kernel can communicate with the IDE IOC 304 using the IDE IOC memory space 402. In this manner, embodiments of the present invention allow two I/O processors for a single PCI device, while hiding one IOC from the operating system.

Figure 5:
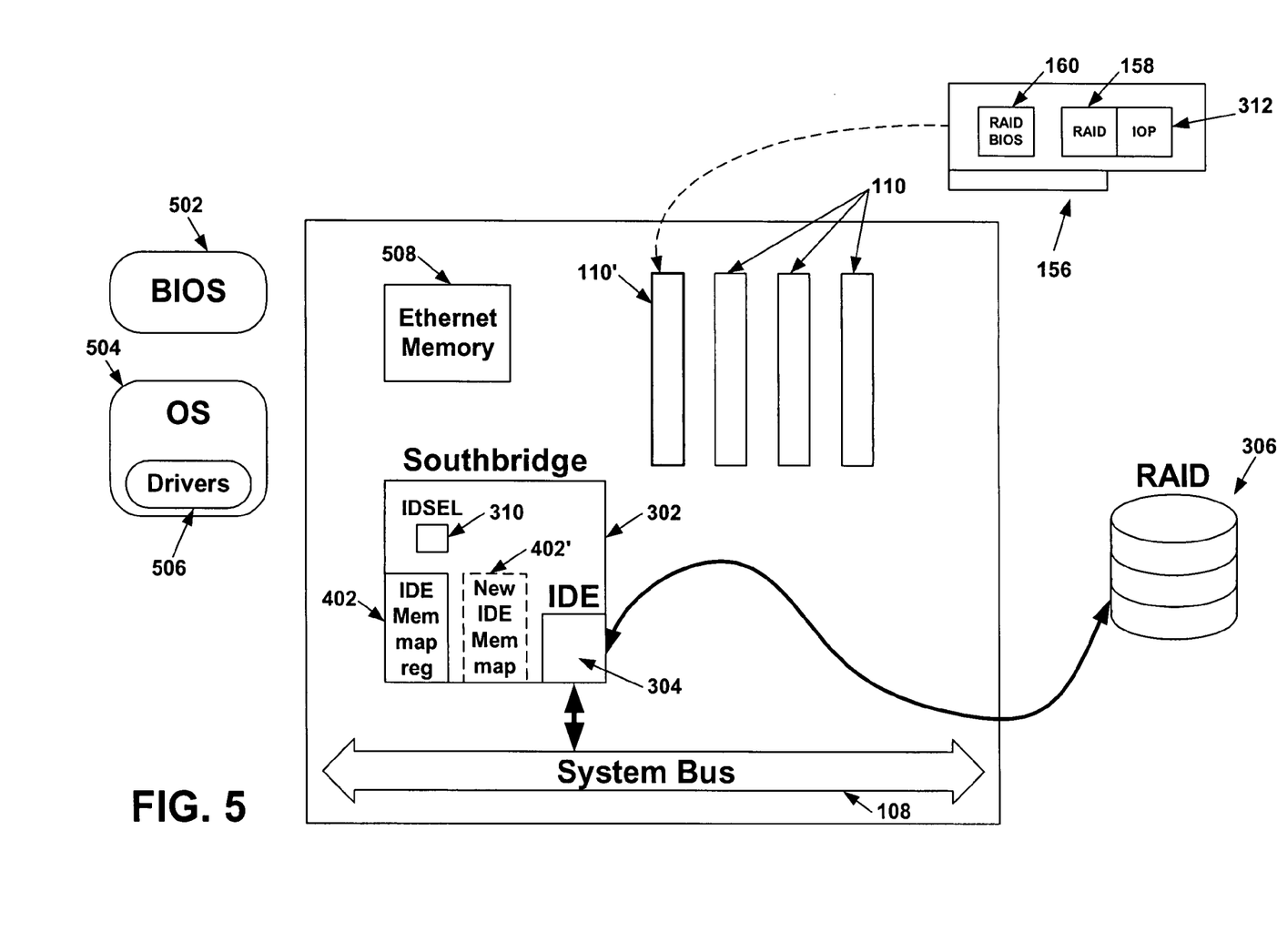
FIG. 5 is a block diagram showing a computer motherboard having I/O chip hiding after startup, in accordance with an embodiment of the present invention.

FIG. 5 is a block diagram showing a computer motherboard 500 having I/O chip hiding after startup, in accordance with an embodiment of the present invention. The computer motherboard 500 includes a Southbridge device 302 in communication with a peripheral component interconnect (PCI) bus 108. As above, the IDE IOC 304 is in communication with a RAID array 306 for persistent storage. In addition, the computer motherboard 500 includes a plurality of PCI slots 110 in communication with the PCI bus 108, for PCI based cards. In addition, a RAID host adapter card 156, which includes a RAID firmware 158 having a RAID IOP 312, is inserted into the RAID PCI slot 110'.

As above, the Southbridge device 302 includes the IDE IOC 304, which provides I/O management for IDE based devices. Since both the IDE IOC 304 and the RAID IOP 312 are present in the system, embodiments of the present invention utilize a hide bit 310 in the Southbridge to hide the IDE IOC 304. In one embodiment, the hide bit 310 is an internal IDSEL bit 310. Embodiments of the present invention can utilize the internal IDSEL bit 310 to indicate whether the RAID host adaptor card 156 is present in the system, and thus, whether I/O chip hiding is necessary. The Southbridge 302 further includes an IDE IOC map register 402 in PCI configuration space of the IDE IOC 304, which is utilized by the IOP kernel in the RAID IOP 312 to communicate with the IDE IOC 304.

After system startup, as described with respect to FIGS. 3 and 4, the RAID IOP 312 has control of the RAID array 306 via the IDE IOC 304. At this point, the system bios 502 examines the system to determine which device is in control of the boot drive, which is part of the RAID array 306. As a result, the system bios will determine that the RAID IOP 312 is in control of the boot drive. Hence, the RAID IOP 312 loads the master boot record from the boot drive into memory. The master boot record includes the operating system loader, which is used to load the operating system from the RAID array 306 to memory.

Once the operating system is loaded, the operating system may reconfigure the PCI configuration space. As a result, the operating system may assign the IDE IOC memory 402 to another system element, such as for example, an Ethernet card. Hence, the Ethernet memory 508 may occupy the same memory space as the IDE IOC memory 402. If this occurs, the RAID IOP 312 can no longer communicate with the IDE IOC 304 using the same IDE IOC memory 402.

In addition reassigning the IDE IOC memory 402, the operating system (OS) may change the address of IOP memory, which also includes the memory space of the IDE IOC 304. When either of these events occurs, the option ROM bios 160 on the RAID card commands the IOP kernel to stop performing background activities. An OS RAID driver then notifies the IOP kernel to check whether a new memory allocation exists. If there is a new memory allocation, the IOP kernel reconfigures the PCI configuration memory space such that a new IDE IOC memory 402' corresponds to the new memory space assigned to the RAID IOP 312 by the operating system. This is performed in a manner similar to that used during system startup.

That is, the IOP kernel writes a zero to the hide bit 310 to expose the IDE IOC 304. When the system bios discovers the hide bit state's change to the expose state, the system bios provides a window of time wherein no system element, other than the IOP kernel, can win arbitration on the PCI bus 108 for the IDE IOC 304. During this window of time, the IOP kernel writes a zero to the hide bit 310 to expose the IDE IOC 304. The IOP kernel also configures the new IDE IOC memory 402' during the window of time provided by the system bios. Because the IOP kernel provides the new IDE IOC memory 402' to the IDE IOC 304, the IOP kernel is aware of the location of the new IDE IOC memory 402'.

After configuring the new IDE IOC memory 402', the IOP kernel writes a one to the hide bit 310 to hide the IDE IOC 304. At this point, the system bios can allow other system elements to win arbitration to the PCI bus 108 because the IDE IOC 304 is hidden from all system elements. Thereafter, the IOP kernel can communicate with the IDE IOC 304 using the new IDE IOC memory space 402'. The operating system 504 then loads the drivers 506 for the system, and the drivers 506 command the RAID IOP 312 to restart background activities.

Figure 6A:
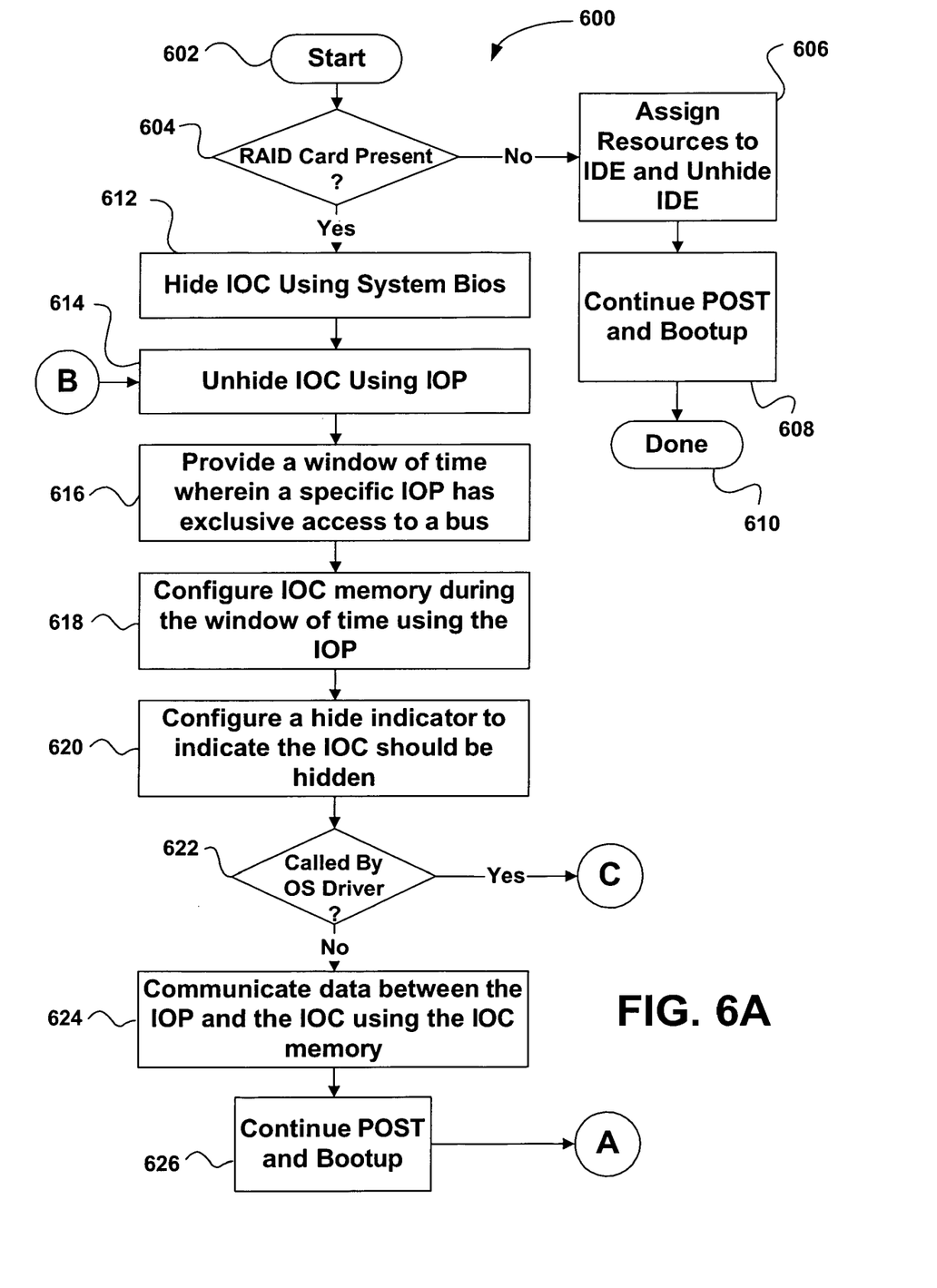
FIGS. 6A and 6B are a flowchart showing a method for hiding an input/output device from an operating system, in accordance with an embodiment of the preset invention.
Figure 6B:
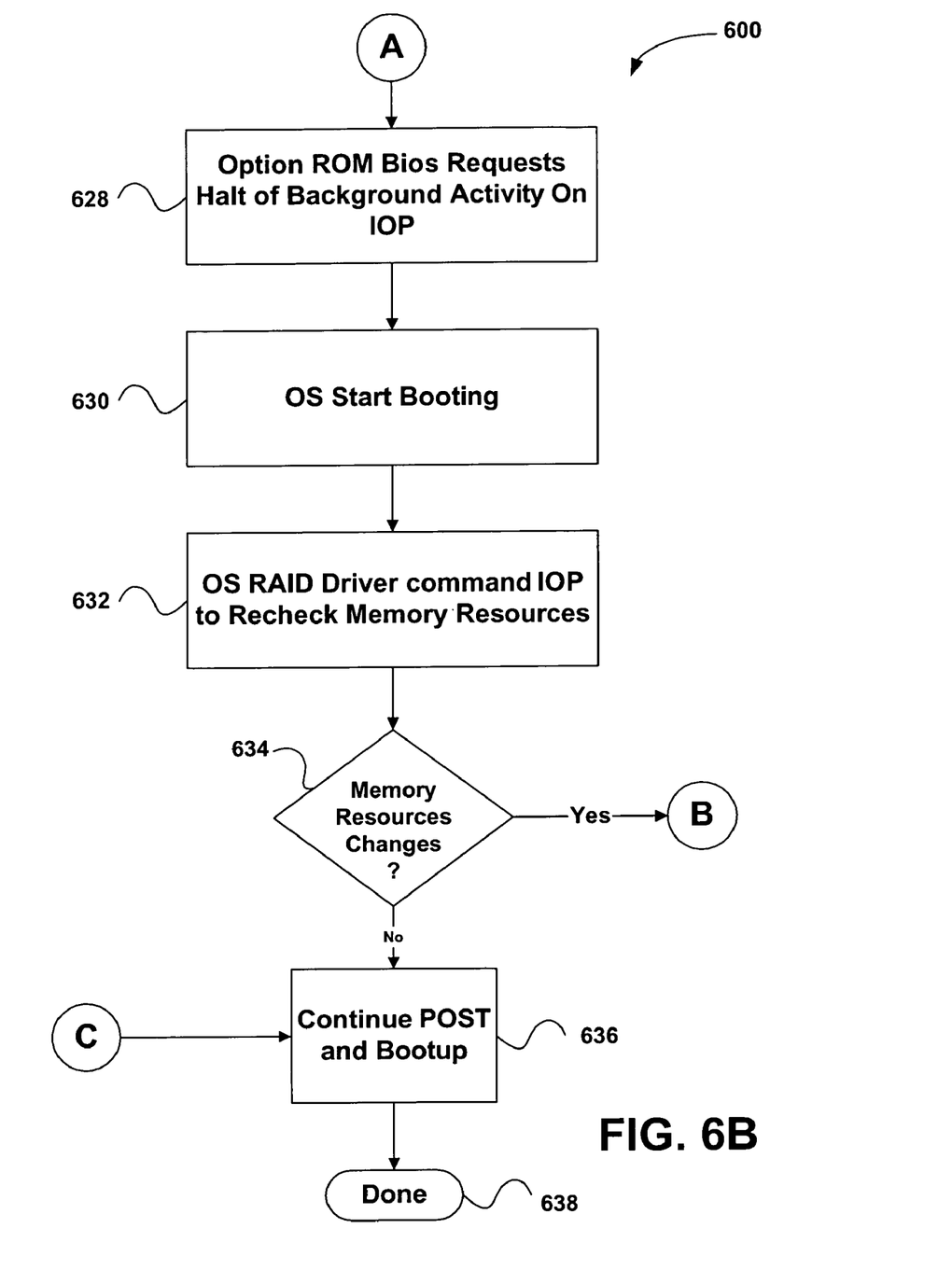

FIGS. 6A and 6B are a flowchart showing a method 600 for hiding an input/output device from an operating system, in accordance with an embodiment of the preset invention. In an initial operation 602, preprocess operations are performed. Preprocess operations can include detecting whether an IOP for controlling the IOC is present in the system, obtaining memory space for both the IOP and the IOC using the IOP registers, and other preprocess operations that will be apparent to those skilled in the art after a careful reading of the present disclosure.

In operation 604, a decision is made to whether a RAID host adapter card is present in the computer system. During system startup, the system bios determines whether the host adaptor card is present in one of the PCI slots. If the host adaptor card is not present, the IDE IOC does not require hiding from the operating system and the method 600 proceeds to operation 606. Otherwise, the method 600 continues with operation 612.

Resources are assigned to the IDE IOC and the IDE IOC is set to an unhidden state, in operation 606. As mentioned above, when a host adaptor card is not present in the computer system, the IDE IOC does not require hiding from the operating system. Hence, system resources are assigned to the IDE IOC in the normal manner. Moreover, exclusive access is not required by the RAID IOP, hence the IDE IOC is set to an unhidden state. The power on self test and the bootup then continue in a normal manner in operation 608, and post process operations are performed in operation 610.

When a host adaptor card is present in the computer system, the IDE IOC is hidden from the operating system, in operation 612. Hence, when the host adaptor card is present in the system, the system bios configures the hide indicator to indicate the IDE IOC should be hidden from the operating system. In operation 614, the RAID IOP unhides the IDE IOC. Unhiding the IDE IOC allows the RAID IOP to locate and communicate with the IDE IOC. To prevent other system elements from accessing the IDE IOC, the system bios provides exclusive access to the RAID IOP for a limited time period, as described next in operation 616.

In operation 616, a window of time is provided wherein a specific IOP has exclusive access to a bus. Embodiments of the present invention configure the system bios such that it guarantees a window of time, using for example a master arbiter, wherein no other system element can win arbitration on the bus for the IOC. For example, the window of time can be 64 PCI cycles, 128 PCI cycles, 256 PCI cycles, or more, as desired by the developer.

In operation 618, the IOC memory is configured during the window of time using the IOP. During this window of time, the IOP kernel configures a hide indicator, such as a hide bit, to expose the IOC and configures the IOC memory. Because the IOP kernel provides the IOC memory to the IOC, the IOP kernel is aware of the location of the IDE IOC memory. That is, the IOP kernel configures the IOP registers such that the system bios sets aside enough memory for both the IOP and the IOC. Hence, the IOP kernel stores the sum of the amount of memory needed by the IOC and the amount of memory needed by the IOP in the IOP registers. In this manner, the bios will set aside enough memory for both the IOP and the IOC, and the IOP can provide that memory to the IOC when needed.

The hide indicator is configured to indicate the IOC should be hidden, in operation 620. The physical configuration of the hide indicator can vary depending on the type of IOC utilized in the system. For example, when the IOC is an IDE IOC, the hide indicator can be a hide bit, such as an IDSEL bit. Once the hide indicator is configured to indicate the IOC should be hidden, for example by writing a one to a hide bit, the IOC is hidden from system elements. At this point, the system bios can allow other system elements to win arbitration to the bus because the IOC is hidden from all system elements.

A decision is then made as to whether an initial system startup is occurring or the current method sequence was initiated by the RAID OS driver, in operation 622. As mentioned above, during startup, the operating system may reassign resources previously configured by the RAID IOP. In such cases, the RAID IOP will initiate another method 600 sequence, as described below with reference to operation 634. Hence, if the current method sequence was initiated by the RAID OS driver, the method 600 branches to pointer C on FIG. 6B. Otherwise, the method 600 continues with operation 624.

Data is then communicated between the IOP and the IOC using the configured IOC memory, in operation 624. Thus, the IOP kernel can communicate with the IOC using the IOC memory space, while allowing the IOC to remain hidden from other system elements. In this manner, embodiments of the present invention allow two I/O processors for a single PCI device, while hiding one IOC from the operating system. The power on self test and the bootup then continue in a normal manner in operation 626, and the method 600 continues to pointer A on FIG. 6B.

From pointer A on FIG. 6B follows operation 628 wherein the RAID option ROM bios requests a halt on background activity of the RAID IOP. The operating system begins booting in operation 630. As mentioned previously, once the operating system is loaded, the operating system may reconfigure the PCI configuration space. As a result, the operating system may assign the IDE IOC memory to another system element, such as for example, an Ethernet card. Hence, the Ethernet memory may occupy the same memory space as the IDE IOC memory. If this occurs, the RAID IOP can no longer communicate with the IDE IOC using the same IDE IOC memory.

In addition reassigning the IDE IOC memory, the operating system (OS) may change the address of IOP memory, which also includes the memory space of the IDE IOC. When either of these events occurs, the option ROM bios on the RAID card commands the IOP kernel to stop performing background activities.

In operation 632, the OS RAID driver notifies the IOP kernel to check whether a new memory allocation exists. A decision is then made as to whether the memory resources have changed, in operation 634. If there is a new memory allocation the method continues to pointer B on FIG. 6A, where the IOP kernel reconfigures the PCI configuration memory space such that a new IDE IOC memory corresponds to the new memory space assigned to the RAID IOP by the operating system. This is performed in a manner similar to that used during system startup.

Otherwise the method 600 continues to operation 636, where the power on self test and the bootup then continue in a normal manner. Post process operations are then performed in operation 638. As shown in FIG. 6B, operation 636 can also be reached from pointer C on FIG. 6A. This can occur when there is a new memory allocation and the IOP kernel reconfigures the PCI configuration memory space such that a new IDE IOC memory corresponds to the new memory space assigned to the RAID IOP by the operating system.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include read-only memory, random-access memory, CD-ROMs, CD-Rs, CD-RWs, magnetic tapes, and other optical data storage devices. The computer readable medium can also be distributed over network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A system for hiding an input/output device from an operating system, comprising:
    an input/output chip (IOC) in communication with a bus;
    an input/output processor (IOP) in communication with the bus, the IOP configured to control the IOC;
    a system bios that provides a window of time wherein the IOP has exclusive access to the bus, exclusive access is provided by allowing no other system element to win arbitration of access to the bus, wherein the IOP configures an IOC memory map register during the window of time such that the configured IOC memory map register allows communication between the IOP and the IOC, and wherein the IOP configures a hide indicator to indicate the IOC should be hidden and the system bios allows other system elements to win arbitration of access to the bus after the IOC is hidden.

2. A system as recited in claim 1, wherein the system bios configures the hide indicator before the window of time to indicate the IOC should be hidden.

3. A system as recited in claim 2, wherein the IOP configures the hide indicator during the window of time to indicate the IOC should be exposed, the hide indicator being configured to expose the IOC prior to configuring the IOC memory.

4. A system as recited in claim 3, wherein the hide indicator is a hide bit.

5. A system as recited in claim 3, wherein the hide indicator is an IDSEL pin.

6. A system as recited in claim 3, wherein a system bios provides the window of time using a master arbiter.

7. A system as recited in claim 1, wherein the system bios provides a new window of time wherein the IOP has exclusive access to the bus in response to an operating system reassigning the IOC memory map register, and wherein the IOP reconfigures the IOC memory map register during the new window of time such that the reconfigured IOC memory map register allows communication between the IOP and the IOC.

8. A method for hiding an input/output device from an operating system, comprising the operations of:
    executing a code segment to provide a window of time wherein a specific input/output processor (IOP) has exclusive access to a bus by allowing no other system element to win arbitration of access to the bus;
    configuring an IOC memory map register during the window of time using the IOP, the IOC memory being utilized by an input/output chip (IOC);
    configuring a hide indicator by the IOP to indicate the IOC should be hidden;
    communicating data between the IOP and the IOC using the IOC memory map register; and
    executing the code segment to allow other system elements to win arbitration of access to the bus after the IOC is hidden.

9. A method as recited in claim 8, further comprising the operation of configuring the hide indicator before the window of time to indicate the IOC should be hidden.

10. A method as recited in claim 9, further comprising the operation of configuring the hide indicator during the window of time to indicate the IOC should be exposed, wherein the hide indicator is configured to expose the IOC prior to configuring the IOC memory map register.

11. A method as recited in claim 10, wherein the hide indicator is a hide bit.

12. A method as recited in claim 11, wherein the hide bit is an IDSEL bit.

13. A method as recited in claim 10, wherein the code segment is a system bios that provides the window of time using a master arbiter.

14. A method as recited in claim 13, wherein the master arbiter is a peripheral component interconnect (PCI) master arbiter.

15. A computer program embodied on a computer readable medium for hiding an input/output device from an operating system, comprising:
    a code segment that provides a window of time wherein a specific input/output processor (IOP) has exclusive access to a bus by allowing no other system element to win arbitration of access to the bus;
    a code segment that configures an IOC memory map register during the window of time, the IOC memory map register being utilized by an input/output chip (IOC); and
    a code segment that configures a hide indicator to indicate the IOC should be hidden, wherein data is communicated between the IOP and the IOC using the IOC memory map register; and
    a code segment that allows other system elements to win arbitration of access to the bus after the IOC is hidden.

16. A computer program as recited in claim 15, further comprising a code segment that configures the hide indicator before the window of time to indicate the IOC should be hidden.

17. A computer program as recited in claim 16, further comprising a code segment that configures the hide indicator during the window of time to indicate the IOC should be exposed, wherein the hide indicator is configured to expose the IOC prior to configuring the IOC memory map register.

18. A computer program as recited in claim 17, wherein the hide bit is an IDSEL bit.

19. A computer program as recited in claim 17, wherein the hide indicator is an IDSEL pin.

20. A computer program as recited in claim 10, wherein a system bios includes the code segment that provides the window of time, and wherein the system bios utilizes a master arbiter to facilitate providing the window of time.

* * * * *